(12) United States Patent
Iino et al.

(10) Patent No.: US 8,604,667 B2
(45) Date of Patent: Dec. 10, 2013

(54) ULTRASONIC MOTOR AND ELECTRONIC APPARATUS WHICH MOUNTS THE MOTOR THEREON

(75) Inventors: Akihiro Iino, Chiba (JP); Yukio Akiyama, Chiba (JP); Satoshi Sakai, Chiba (JP); Takuo Oosaki, Chiba (JP); Masakazu Hirabayashi, Chiba (JP); Masatomo Moriko, Chiba (JP)

(73) Assignee: Seiko Instruments Inc. (JP)

( * ) Notice: Subject to any disclaimer, the term of this patent is extended or adjusted under 35 U.S.C. 154(b) by 292 days.

(21) Appl. No.: 13/065,892

(22) Filed: Mar. 31, 2011

(65) Prior Publication Data

US 2011/0241486 A1 Oct. 6, 2011

(30) Foreign Application Priority Data

Apr. 1, 2010 (JP) ................................. 2010-085452

(51) Int. Cl.
*H02N 2/12* (2006.01)

(52) U.S. Cl.
CPC ...................................... *H02N 2/12* (2013.01)
USPC ...................................... 310/323.02; 310/366

(58) Field of Classification Search
CPC .......... H01L 41/047; H02N 2/02; H02N 2/04; H02N 2/10; H02N 2/12; H02N 2/16; H02N 2/166
USPC ........................................ 310/323.01–323.21
See application file for complete search history.

(56) References Cited

U.S. PATENT DOCUMENTS 6,404,103 B1 * 6/2002 Suzuki et al. ............ 310/323.01
6,690,100 B1 * 2/2004 Koroishi et al. ......... 310/323.03

OTHER PUBLICATIONS

Patent Abstracts of Japan, publication No. 03-219681, publication date Sep. 27, 1991.
Patent Abstracts of Japan, publication No. 08-107686, publication date Apr. 23, 1996.

* cited by examiner

*Primary Examiner* — Derek Rosenau
(74) *Attorney, Agent, or Firm* — Adams & Wilks

(57) ABSTRACT

An ultrasonic motor exhibits stable performances by suppressing irregularities of magnitudes of two standing waves excited by a piezoelectric element. A plurality of divided electrodes are mounted on one surface of the piezoelectric element and are equidistantly arranged in the circumferential and radial directions and have equal polarized areas. Alternate ones of the divided electrodes are short-circuited in the radial direction by inner electrodes arranged on the inner peripheral side of the divided electrodes, and the other alternate ones of the divided electrodes are short-circuited in the radial direction by outer electrodes arranged on the outer peripheral side of the divided electrodes.

21 Claims, 9 Drawing Sheets

ULTRASONIC MOTOR AND ELECTRONIC APPARATUS WHICH MOUNTS THE MOTOR THEREON

BACKGROUND OF THE INVENTION

1. Field of the Invention

The present invention relates to an ultrasonic motor which drives a moving body by friction by making use of oscillations of an oscillating body which is excited by a piezoelectric element, and an electronic apparatus which mounts the ultrasonic motor thereon.

2. Background Art

An ultrasonic motor which uses a disc-shaped or an annular oscillating body is classified into a progressive wave type ultrasonic motor and a standing wave type ultrasonic motor depending on a type of oscillations generated in the oscillating body. The former requires two groups of electrodes for exciting two oscillations which differ from each other in phase in terms of position in the oscillating body. On the other hand, although the latter uses only one group of electrodes at the time of driving, the latter requires two groups of electrodes corresponding to two standing waves since it is necessary to displace a position of the standing waves which are excited in the oscillating body in changing the moving direction of a moving body.

In a state where each of these two groups of electrodes is constituted of a plurality of electrodes, when a method which connects conductive members such as lead lines to respective electrode is adopted, there exists a possibility that a manufacturing cost is pushed up, and oscillations of a oscillating body are interrupted so that the performance of the ultrasonic motor is lowered or large performance irregularities occur. To cope with such drawbacks, there has been known a technique in which two groups of electrodes are constituted such that, in one group of electrodes, every other divided electrode in the circumferential direction of a piezoelectric element is short-circuited at an inner peripheral side of the piezoelectric element and, in the other group of electrodes, remaining other divided electrodes are short-circuited at an outer peripheral side of the piezoelectric element.

SUMMARY OF THE INVENTION

However, in the electrode structure disclosed in JP-A-3-219681 (patent document 1), a plurality of electrodes which constitute the group of electrodes which are short-circuited at the inner peripheral side of the piezoelectric element have projecting portions projecting more toward an inner peripheral side than a plurality of electrodes which constitute another group of electrodes. Accordingly, these two groups of electrodes differ from each other in an area of the electrodes driven by a drive signal.

In a case of the progressive wave type ultrasonic motor, to acquire the ideal excitation of progressive waves (a height of wave front being always constant), it is necessary to excite two standing waves which have the same amplitude but differ from each other in phase in terms of position. In such electrode structure, however, amplitudes of two standing waves differ from each other so that a height of wave front is changed with time. Accordingly, a contact state between an oscillating body and a moving body is also changed thus giving rise to a possibility that the characteristics of the ultrasonic motor are lowered and the durability of the ultrasonic motor is lowered. Further, in a case of the standing wave type ultrasonic motor disclosed in JP-A-8-107686 (patent document 2), there exists a drawback that when amplitudes of two standing waves differ, the characteristics of the ultrasonic motor differ depending on the moving direction of a moving body.

To overcome these drawbacks, according to one aspect of the present invention, there is provided an ultrasonic motor which includes: a disc-shaped or an annular piezoelectric element; a plurality of divided electrodes which are mounted on one surface of the piezoelectric element and are equidistantly arranged in the circumferential direction; an inner peripheral electrode which is arranged on an inner peripheral side of the divided electrodes; an outer peripheral electrode which is arranged on an outer peripheral side of the divided electrodes; a plurality of inner peripheral short-circuiting electrodes which are mounted on every other divided electrode out of the divided electrodes and on the inner peripheral electrode so as to make every other divided electrode short-circuited with the inner peripheral electrode in the radial direction of the piezoelectric element; a plurality of outer peripheral short-circuiting electrodes which are mounted on the divided electrodes which are not short-circuited with the inner peripheral electrodes out of the divided electrodes and on the outer peripheral electrode so as to make the divided electrodes which are not short-circuited with the inner peripheral electrode short-circuited with the outer peripheral electrode in the radial direction of the piezoelectric element; an oscillating body which is connected to the piezoelectric element; a moving body which is brought into contact with the oscillating body; and a pressurizing member which brings the oscillating body and the moving body into pressure contact with each other.

Due to such a constitution, divided electrodes which constitute two groups of electrodes and are subject to the polarization treatment have the same area and hence, amplitudes of oscillations which are excited by two groups of electrodes respectively become equal.

Further, the outer peripheral short-circuiting electrode may have an extending portion which extends in the circumferential direction of the piezoelectric element at a portion where the outer peripheral short-circuiting electrode overlaps with the outer peripheral electrode, or a width of the extending portion may be set larger than a width of the inner peripheral electrode. Further, a width of the outer peripheral electrode may be set larger than a width of the inner peripheral electrode.

Due to such constitutions, the difference in resistance value of electrodes at portions where the plurality of electrodes which constitute two groups of electrodes are short-circuited can be made equal or can be made as small as possible between these two groups of electrodes. Accordingly, even when impedance of the oscillating body at the time of resonance becomes low and the difference in resistance value between two groups of electrodes is influenced by such lowering of impedance due to the setting of a thickness of the piezoelectric element small, it is possible to make amplitudes of oscillations excited respectively by two groups of electrodes equal or to make the difference between the amplitudes as small as possible. Further, it is possible to lower the resistance of the short-circuiting portion on the outer periphery of the piezoelectric element where the resistance value is liable to become high.

According to the present invention, amplitudes of oscillations respectively excited by two groups of electrodes of the piezoelectric element can be made equal or can be made as small as possible and hence, it is possible to enhance the characteristics of the ultrasonic motor. Particularly, when the ultrasonic motor is a progressive wave type ultrasonic motor, it is possible to enhance the durability of the ultrasonic motor. On the other hand, when the ultrasonic motor is a standing wave type, the characteristics of the ultrasonic motor which depends on the moving direction of the moving body can be made equal or the difference in characteristics of the ultrasonic motor depending on the moving direction can be made as small as possible.

DESCRIPTION OF THE PREFERRED EMBODIMENT

Figure 1:
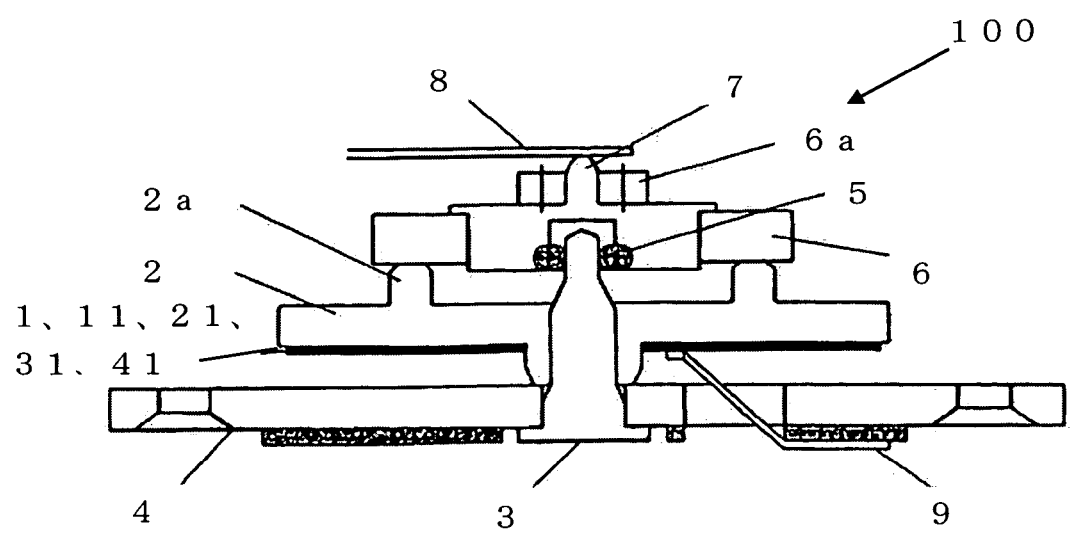
FIG. 1 is a longitudinal cross-sectional view showing the structure of an ultrasonic motor according to the present invention.

An ultrasonic motor according to the present invention is explained in conjunction with drawings. FIG. 1 is a longitudinal cross-sectional view of an ultrasonic motor 100 according to the present invention. The ultrasonic motor 100 is constituted of an oscillating body 2 to which a piezoelectric element 1, 11, 21, 31, 41 is fixed by adhesion, a center shaft 3 which supports the oscillating body 2, a fixing plate 4 which fixes the center shaft 3 thereto, a moving body 6 which has a bearing 5 at the center thereof and is rotatably guided by the center shaft 3, a pivot 7 which is mounted on an upper center portion of the moving body 6, a leaf spring 8 which is a pressure applying spring for pressuring the pivot 7 with a predetermined pressure force thus generating a contact pressure between the moving body 6 and projections 2a formed on the oscillating body 2, a gear 6a which is mounted on the moving body 6, and a lead line 9 which supplies electricity to the piezoelectric element 1, 11, 21, 31, 41. The structure of the ultrasonic motor 100 is substantially equal to the structure of the ultrasonic motors disclosed in patent documents 1, 2, and the drive principle of the progressive wave type ultrasonic motor is disclosed in patent document 1 and the driving principle of the standing wave type ultrasonic motor is disclosed in patent document 2 and hence, the detailed explanation of the structure and the drive principle of the ultrasonic motor 100 is omitted.

Hereinafter, the piezoelectric element 1, 11, 21, 31, 41 used in the ultrasonic motor 100 which constitutes the technical feature of the present invention is explained in detail.

Embodiment 1

Figure 2A:
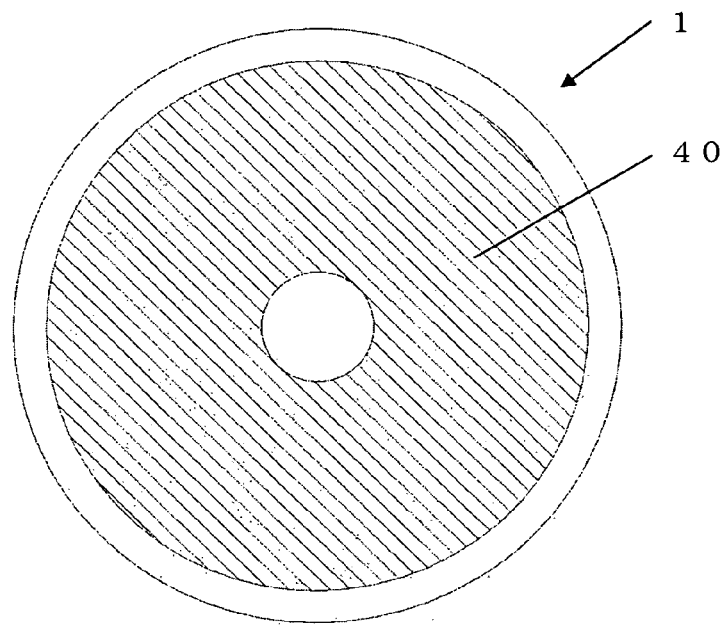
FIG. 2A and FIG. 2B are views showing the electrode structure of a piezoelectric element according to an embodiment 1 of the present invention.
Figure 2B:
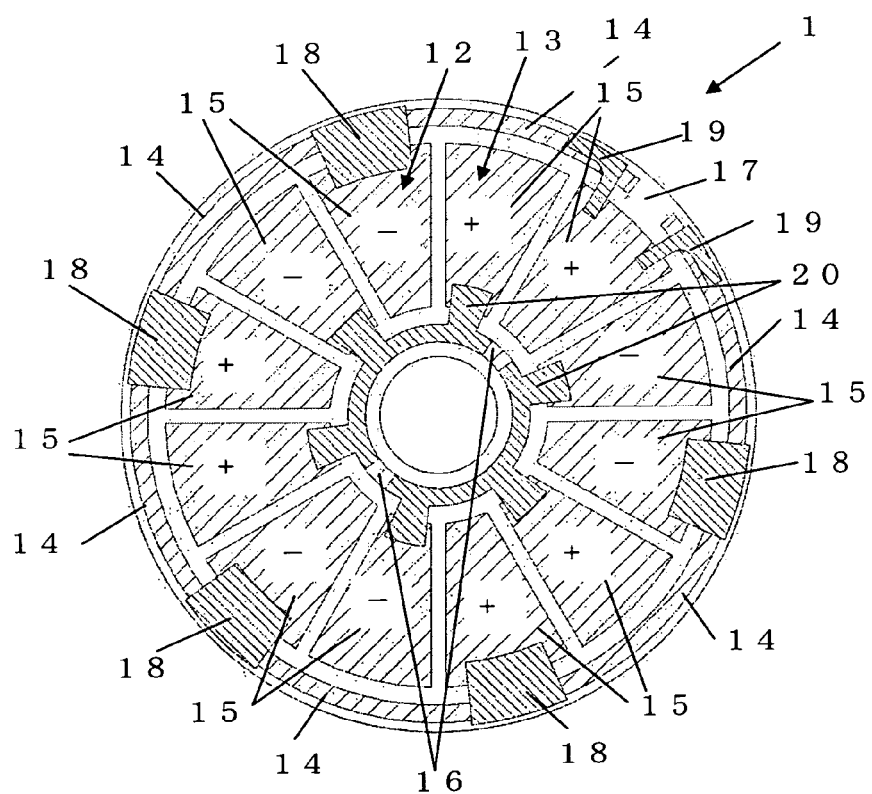
Figure 3:
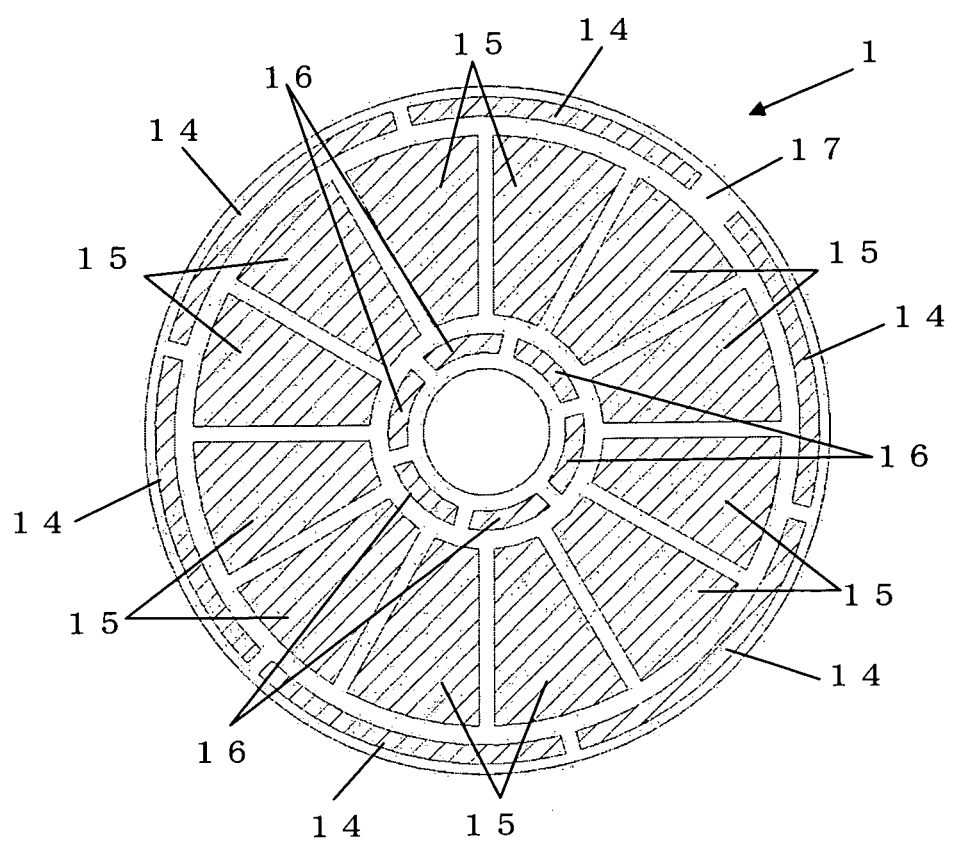
FIG. 3 is a view for explaining a manufacturing method of the electrode structure of the piezoelectric element according to the embodiment 1 of the present invention.

The embodiment 1 of the present invention is explained in conjunction with FIG. 2A, FIG. 2B and FIG. 3. FIG. 2A and FIG. 2B are views showing shapes of electrodes mounted on front and back surfaces of the piezoelectric element 1, wherein FIG. 2A is the view showing the front surface of the piezoelectric element 1 (a surface of the piezoelectric element 1 which is adhered to the oscillating body 2), and FIG. 2B is a view showing a back surface of the piezoelectric element 1 (a surface of the piezoelectric element 1 which is exposed after the piezoelectric element 1 is adhered to the oscillating body 2).

An electrode 40 which constitutes an adhesion surface with the oscillating body 2 is formed on the substantially whole surface of the piezoelectric element 1. The electrode 40 is formed as a film on the piezoelectric element 1 by vapor deposition in order of a Cr film, an Ni film and an Au film. The Cr film is provided for increasing bonding between the Ni film and the Au film and the piezoelectric element 1, the Ni film is provided for enhancing solder bonding property with the lead line 9, and the Au film has a function of lowering an electrode resistance. All electrodes explained hereinafter are formed as films by vapor deposition using these materials. However, materials for forming the electrodes may be suitably changed, and a film forming method is not limited to the vapor deposition method. That is, the electrodes may be formed by other methods such as a sputtering method and a printing method. Although a marginal portion where the electrode 40 is not formed is provided on an outer peripheral portion of the piezoelectric element 1, this marginal portion is a trace of a mask which is used in a vapor deposition step, and electrodes may be formed on the whole surface of the piezoelectric element 1.

On the back surface of the piezoelectric element 1, a first group of electrodes 12 in which the plurality of divided electrodes 15 which are arranged in the circumferential direction are short-circuited on the inner peripheral side of the piezoelectric element 1 every other electrode, and a second group of electrodes 13 in which the plurality of divided electrodes 15 which are arranged in the circumferential direction are short-circuited on the outer peripheral side of the piezoelectric element 1 every other electrode are formed. The first group of electrodes 12 is constituted of the divided electrodes 15 which are arranged every other electrode, an inner peripheral electrode 16 and inner peripheral short-circuiting electrodes 20, while the second group of electrodes 13 is constituted of the remaining divided electrodes 15 which do not constitute the first group of electrodes 12 and are arranged every other electrode, an outer peripheral electrode 14, outer peripheral short-circuiting electrodes 18 and marking-use outer peripheral short-circuiting electrodes 19.

Next, a manufacturing method of these groups of electrodes 12, 13 is explained in conjunction with FIG. 2B and FIG. 3. The manufacture of the groups of electrodes 12, 13 is completed through two steps. Firstly, as shown in FIG. 3, the divided electrodes 15 which are equidistantly arranged in the circumferential direction of the piezoelectric element 1, the outer peripheral electrode 14 which is arranged outside the divided electrodes 15 (an outer peripheral portion of the piezoelectric element 1), and the inner peripheral electrode 16 which is arranged inside the divided electrodes 15 (an inner peripheral portion of the piezoelectric element 1) are formed as films. The divided electrodes 15 are equidistantly arranged at an interval which is ¼ of a wavelength of the bending oscillations excited in the oscillating body 2. The divided electrodes 15 are formed of 12 split fractions and hence, the divided electrodes 15 are designed such that oscillations of 3 waves are generated in the oscillating body 2. Although the outer peripheral electrode 14 and the inner peripheral electrode 16 are arranged over the whole circumferential direction of the piezoelectric element 1, the outer peripheral electrode 14 and the inner peripheral electrode 16 are respectively provided with separation portions where the peripheral electrodes 14, 16 are partially separated. The separated portions are necessary from a viewpoint of the constitution of a mask which is used in forming the outer peripheral electrode 14 and the inner peripheral electrode 16 as films by vapor deposition. A large separated portion 17 which constitutes one of the separated portions and defines a wider gap compared to other separated portions also functions as a mark for forming the electrode structure on the back surface of the piezoelectric element 1 as explained later. The separated portions of the outer peripheral electrode 14 and the separated portions of the inner peripheral electrode 16 correspond to the divided electrodes 15 which are different from each other and are arranged in the circumferential direction every other respectively. In such a state, the polarization treatment is applied to the piezoelectric element 1 by applying a high voltage between the electrode 40 and the divided electrodes 15. Here, the direction of a voltage to be applied (indicated by symbols "+", "−") is changed every third electrode 15.

On the piezoelectric element 1 to which the polarization treatment is applied, the inner peripheral short-circuiting electrodes 20 which make the divided electrodes 15 and the inner peripheral electrode 16 short-circuited, the outer peripheral short-circuiting electrodes 18 which make the divided electrodes 15 and the outer peripheral electrode 14 short-circuited, and the marking-use outer peripheral short-circuiting electrodes 19 are formed as films so that the first group of electrodes 12 and the second group of electrodes 13 are formed (see FIG. 2B). Two L-shaped marking-use outer peripheral short-circuiting electrodes 19 are arranged at positions close to the large separated portion 17, and the large separated portion 17 (not being short-circuited by the outer peripheral short-circuiting electrode 18) becomes a mark indicative of the polarization direction of the piezoelectric element 1. Further, the large separated portion 17 is used as a mark in positioning the piezoelectric element 1 with respect to the projections formed on the oscillating body 2 at the time of adhering the piezoelectric element 1 and the oscillating body 2 to each other or the like. However, when it is unnecessary to form such a mark indicative of the polarization direction of the piezoelectric element 1 in this manner, it is desirable to provide the outer peripheral short-circuiting electrode 18 also to the large separated portion 17 thus lowering the conduction resistance on the outer peripheral electrodes 14 and the outer peripheral short-circuiting electrodes 18. That is, the separation distance equal to the separation distance of other separated parts may be given without forming the large separated portion 17 which has the large separation distance.

Basically, the inner peripheral short-circuiting electrodes 20, the outer peripheral short-circuiting electrodes 18 and the marking-use outer peripheral short-circuiting electrodes 19 are formed by vapor deposition using the same step. However, by applying different vapor deposition steps among the inner peripheral short-circuiting electrodes 20, the outer peripheral short-circuiting electrodes 18, and the marking-use outer peripheral short-circuiting electrodes 19, a thickness of the outer peripheral short-circuiting electrodes 18 and a thickness of the marking-use outer peripheral short-circuiting electrodes 19 can be set larger than a thickness of the inner peripheral short-circuiting electrodes 20 so that a resistance value of the first group of electrodes 12 and a resistance value of the second group of electrodes 13 can be adjusted.

According to the present invention, in the piezoelectric element 1, a total area of portions of the first group of electrodes 12 to which the polarization treatment is applied and a total area of portions of the second group of electrodes 13 to which the polarization treatment is applied are equal and hence, amplitudes of the respective oscillations excited by two groups of electrodes become equal.

Embodiment 2

This embodiment relates to a modification of the electrode structure of the piezoelectric element 1 explained in conjunction with the embodiment 1. When a thickness of the piezoelectric element is made small so that the impedance at the time of resonance becomes small or the like, there may arise a case where it is necessary to take the difference in resistance value between the first group of electrodes 12 and the second group of electrodes 13 into consideration. This difference in resistance value originally occurs due to a phenomenon that a short-circuiting path on the inner peripheral side is shorter than a short-circuiting path on the outer peripheral side so that the resistance on the inner peripheral side is suppressed to a low value. In the piezoelectric element 1 described in the embodiment 1, the inner peripheral short-circuiting electrode 20 has extending portions which extend in the circumferential direction, and these extending portions overlap with the inner peripheral electrode 16 and hence, a resistance value of the first group of electrodes 12 is further lowered thus giving rise to a possibility that the difference between the resistance value of the first group of electrodes 12 and the resistance value of the second group of electrodes 13 is increased. The present invention has been made to overcome such a drawback.

Figure 4:
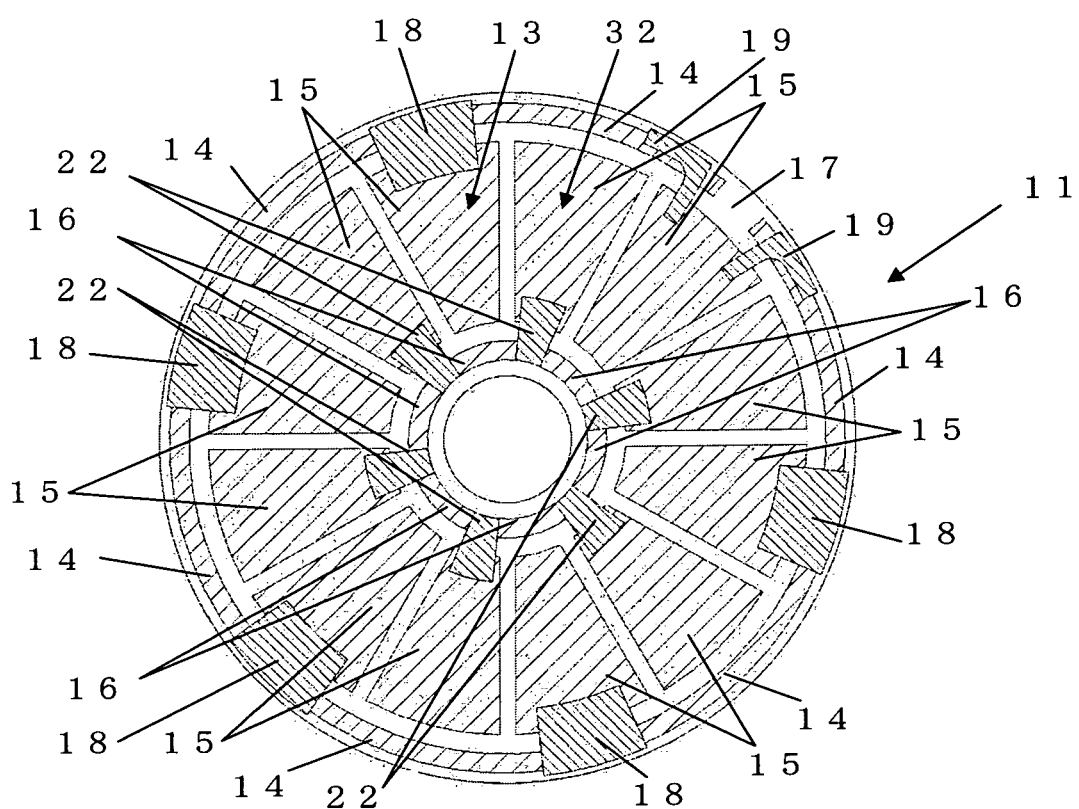
FIG. 4 is a view showing the electrode structure of a back surface of a piezoelectric element according to an embodiment 2 of the present invention.

The electrode structure of a piezoelectric element 11 according to the present invention is explained by focusing on the difference between the embodiment 2 and the embodiment 1. FIG. 4 is a view showing the electrode structure formed on a back surface of the piezoelectric element 11. Although inner peripheral short-circuiting electrodes 22 are constituted of six small electrodes, these inner peripheral short-circuiting electrodes 22 are not connected to each other in the circumferential direction. Accordingly, the inner peripheral short-circuiting electrodes 22 are minimum electrodes which make the inner peripheral electrodes 16 and divided electrodes 15 short-circuited so that the lowering of a resistance value of a first group of electrodes 32 more than a required amount can be suppressed.

Figure 5:
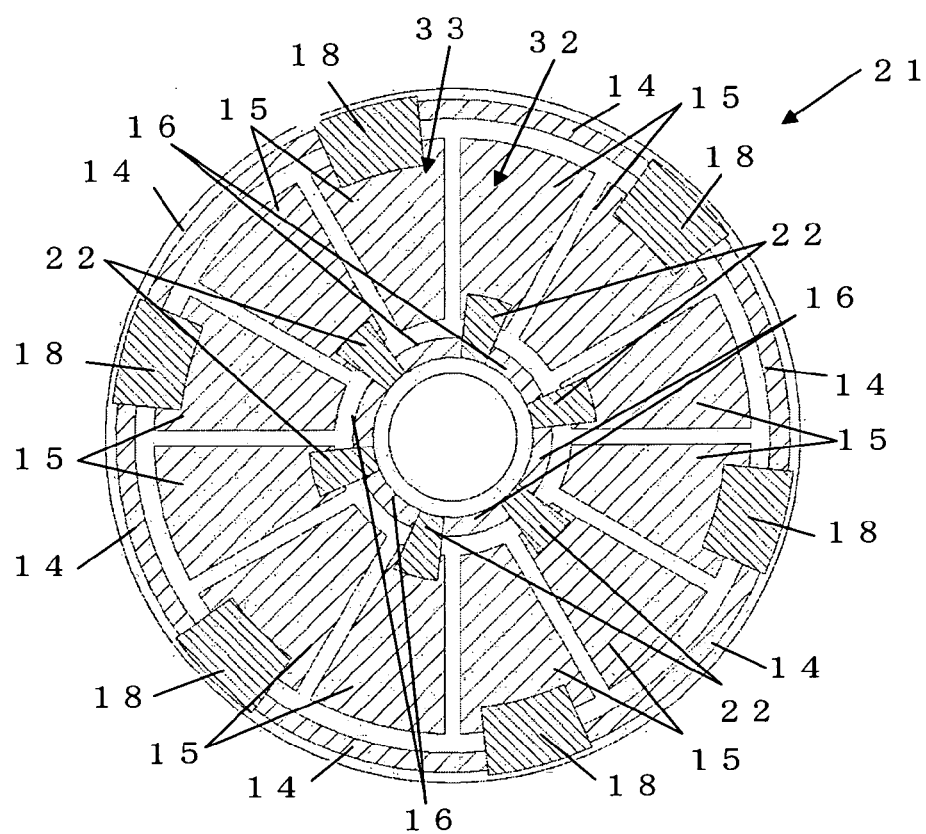
FIG. 5 is a view showing another example of the electrode structure of the back surface of the piezoelectric element according to the embodiment 2 of the present invention.

FIG. 5 shows the electrodes of a piezoelectric element 21 with further improvement. Here, the piezoelectric element 21 adopts the electrode structure where divided electrodes 15 and outer peripheral electrodes 14 are short-circuited using six outer peripheral short-circuiting electrodes 18 without forming the large separated portion 17. Due to such structure, a closed short-circuited electrode which extends around the whole outer periphery of the piezoelectric element 21 is formed and hence, a resistance value of a second group of electrodes 33 can be lowered whereby the difference between a resistance value of a first group of electrodes 32 and a resistance value of a second group of electrodes 33 can be made further smaller.

Embodiment 3

Figure 6:
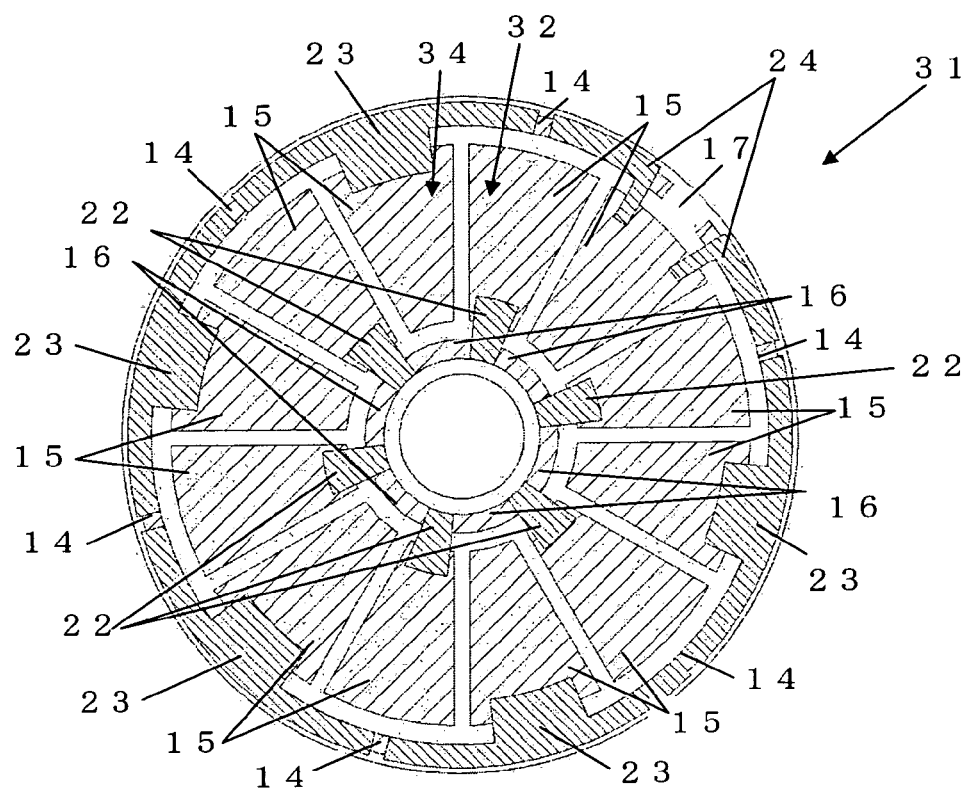
FIG. 6 is a view showing the electrode structure of a back surface of a piezoelectric element according to an embodiment 3 of the present invention.

FIG. 6 shows an improvement example of the piezoelectric elements 11, 21 according to the embodiment 2. Each outer peripheral short-circuiting electrodes 23 has portions which extend in the circumferential direction, and the portions overlap with outer peripheral electrodes 14 and hence, the resistance value of the second group of electrodes 34 can be further lowered whereby the difference between a resistance value of a first group of electrodes 32 and a resistance value of the second group of electrodes 34 can be made further small. Also with respect to marking-use outer peripheral short-circuiting electrodes 24, a length of a portion of the marking-use outer peripheral short-circuiting electrode 24 which extends in the circumferential direction is further elongated, and a width of the extending portion is set equal to a width of the outer peripheral electrode 14.

In manufacturing steps, thicknesses of the inner peripheral short-circuiting electrodes 22, the outer peripheral short-circuiting electrodes 23 and the marking-use outer peripheral short-circuiting electrodes 24 can be set separately from thicknesses of the outer peripheral electrodes 14, the divided electrodes 15 and the inner peripheral electrodes 16. Accordingly, these thicknesses may be suitably adjusted respectively so as to eliminate the difference between the resistance value of the first group of electrodes 32 and the resistance value of the second group of electrodes 34. Further, lengths and widths of the extending portions of the outer peripheral short-circuiting electrodes 23 and the marking-use outer peripheral short-circuiting electrodes 24 may be adjusted respectively. Although the inner peripheral short-circuiting electrodes 22, the outer peripheral short-circuiting electrodes 23 and the marking-use outer peripheral short-circuiting electrodes 24 are formed in the same step by vapor deposition basically, it is possible to make the further adjustment of the resistance values of the electrodes by applying different vapor deposition steps to the inner peripheral short-circuiting electrodes 22, the outer peripheral short-circuiting electrodes 23 and the marking-use outer peripheral short-circuiting electrodes 24 respectively.

Figure 7:
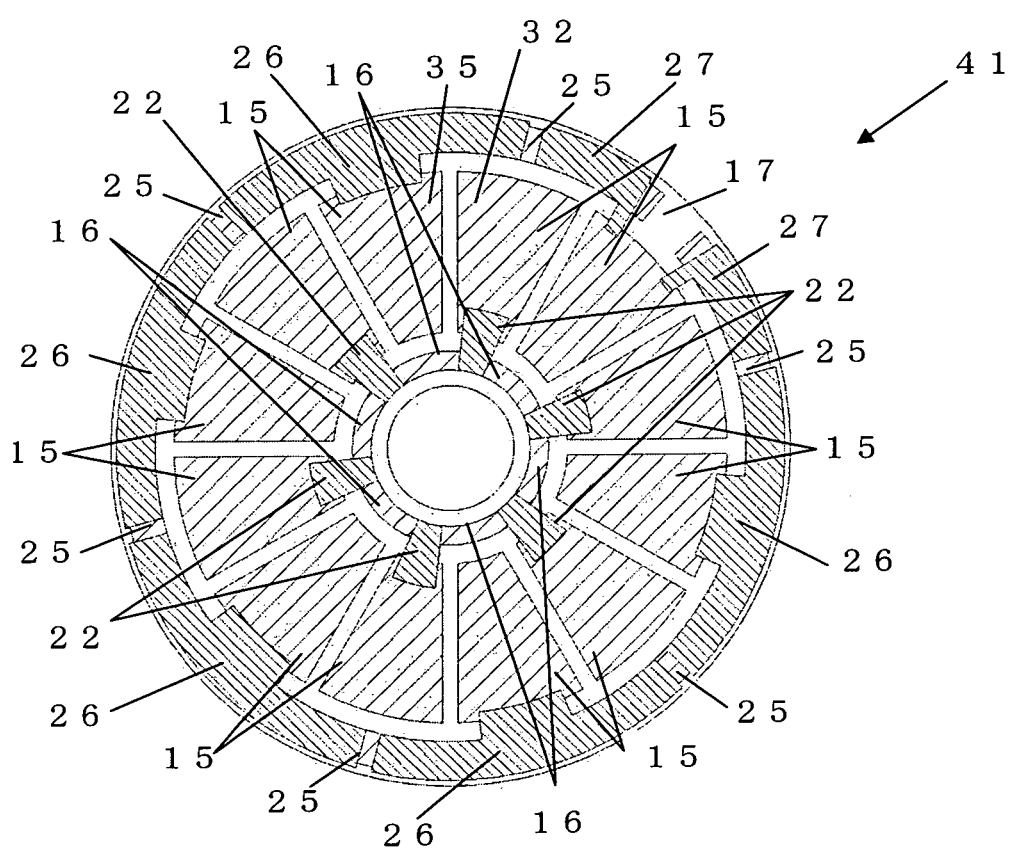
FIG. 7 is a view showing another example of the electrode structure of the back surface of the piezoelectric element according to the embodiment 3 of the present invention.
Figure 8:
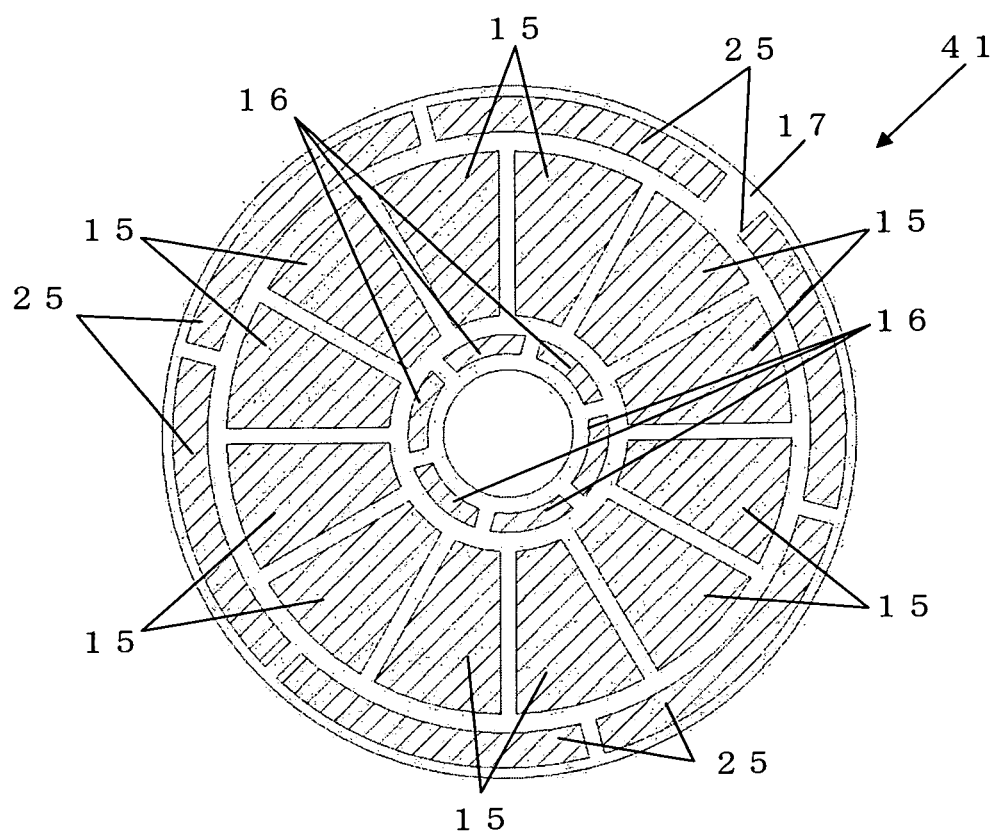
FIG. 8 is a view for explaining a manufacturing method of the electrode structure of the piezoelectric element according to another example of the embodiment 3 of the present invention.

FIG. 7 shows the electrode structure (back surface) of a piezoelectric element 41 when it is necessary to further lower a resistance value of short-circuited portions on an outer periphery of the piezoelectric element 41, and FIG. 8 is a view for explaining a manufacturing method of the electrode structure of the piezoelectric element 41.

In FIG. 7, widths of electrodes 25, outer peripheral short-circuiting electrodes 26 and marking-use outer peripheral short-circuiting electrodes 27 which are positioned on the outer periphery of the piezoelectric element 41 are set larger than a width of an inner peripheral electrode 16 positioned on the inner periphery of the piezoelectric element 41. Due to such a constitution, a resistance value of short-circuited portions of the electrodes on the outer periphery, that is, a resistance value of a second group of electrodes 35 can be surely lowered.

Embodiment 4

Figure 9:
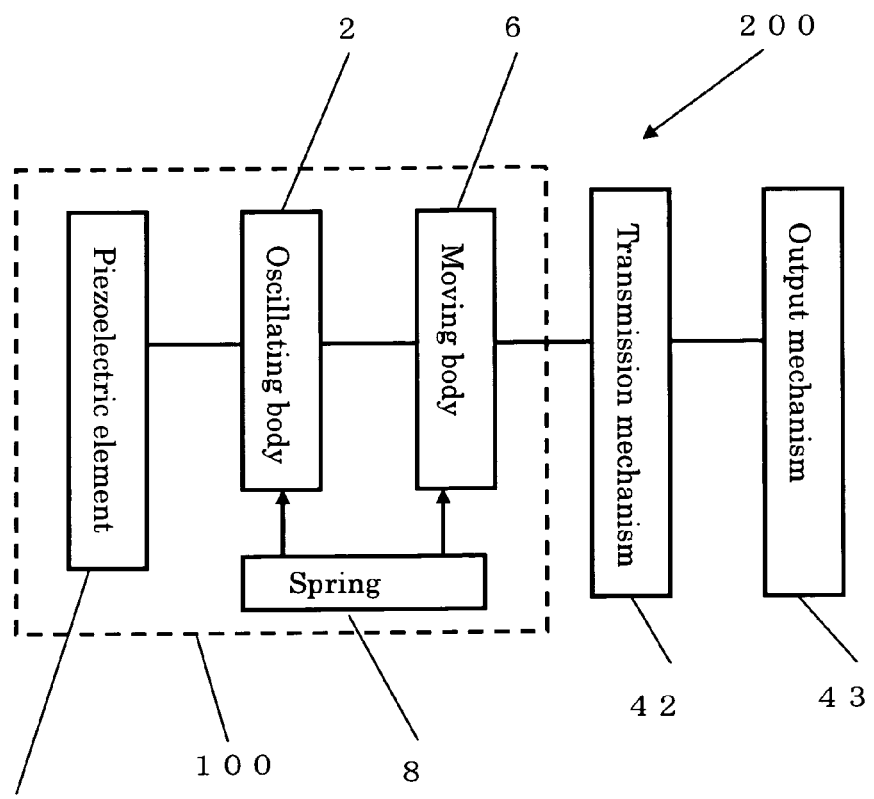
FIG. 9 is a block diagram showing the constitution of an electronic apparatus which mounts the ultrasonic motor according to the present invention thereon.

An example in which an electronic apparatus 200 is constituted using the ultrasonic motor 100 according to the present invention is explained in conjunction with FIG. 9.

FIG. 9 is a block diagram of the electronic apparatus 200 in which the ultrasonic motor 100 according to the present invention is applied to the electronic apparatus as a drive source. The electronic apparatus 200 is constituted of a moving body 6 which is driven by friction by the oscillating body 2 which is connected to the piezoelectric element 1, 11, 21, 31, 41, a pressure applying spring 8, a transmission mechanism 42 which is integrally operated with the moving body 6, and an output mechanism 43 which is operated based on an operation of the transmission mechanism 42. Here, the explanation is made by taking a case where the moving body 6 is rotated as a rotary body as an example.

In this example, the power transmission mechanism 42 is, for example, constituted of a gear train which is meshed with and rotated with a gear 6a mounted on the moving body 6 or a power transmission wheel such as a friction wheel which is brought into friction contact with the gear 6a. The output mechanism 43 which constitutes an operational part may be a paper feeding mechanism used in a printer, a shutter driving mechanism, a lens driving mechanism and a film take-up mechanism and the like used in a camera, a pointer and the like used in an electronic apparatus and a measurement apparatus, an arm mechanism used in a robot, a cutting tool feeding mechanism used in a machine tool, a working member feeding mechanism and the like used in a machine tool.

Here, the electronic apparatus according to the embodiments of the present invention can be realized in a form of an electronic clock, a measurement apparatus, a camera, a printer, a printing machine, a robot, a machine tool, a gaming machine, an information storage device, a medical apparatus, a moving device and the like. Further, an ultrasonic motor driving device can be realized by directly mounting an operating member on the moving body 6 per se, or by mounting an output shaft on the moving body 6 thus providing a power transmission mechanism for transmitting a torque from the output shaft to the ultrasonic motor.

The ultrasonic motor according to the present invention exhibits advantageous effects particularly in the miniaturization of the ultrasonic motor, and is applicable as a drive source of various electronic apparatuses which require an actuator such as a drive device for driving a pointer and a calendar of a wrist watch, a drive device for driving reading and writing heads in an information storage device, and a drive device for driving a lens of a digital camera, a video camera or the like.

What is claimed is:
1. An ultrasonic motor comprising:
   a disc-shaped or an annular piezoelectric element;
   a plurality of divided electrodes mounted on one surface of the piezoelectric element, the divided electrodes being equidistantly arranged in the circumferential and radial directions and having equal areas;
   an inner peripheral electrode arranged on an inner peripheral side of the divided electrodes;
   an outer peripheral electrode arranged on an outer peripheral side of the divided electrodes;
   a plurality of inner peripheral short-circuiting electrodes mounted on every other divided electrode out of the divided electrodes and on the inner peripheral electrode so as to make said every other divided electrode short-circuited with the inner peripheral electrode in the radial direction of the piezoelectric element;
   a plurality of outer peripheral short-circuiting electrodes mounted on the divided electrodes which are not short-circuited with the inner peripheral electrodes out of the divided electrodes and on the outer peripheral electrode so as to make the divided electrodes which are not short-circuited with the inner peripheral electrode short-circuited with the outer peripheral electrode in the radial direction of the piezoelectric element;
   an oscillating body connected to the piezoelectric element;
   a moving body in contact with the oscillating body; and a pressurizing member which brings the oscillating body and the moving body into pressure contact with each other.

2. The ultrasonic motor according to claim 1, wherein the outer peripheral short-circuiting electrode has an extending portion which extends in the circumferential direction of the piezoelectric element at a portion where the outer peripheral short-circuiting electrode overlaps with the outer peripheral electrode.

3. The ultrasonic motor according to claim 2, wherein a width of the extending portion is set larger than a width of the inner peripheral electrode.

4. The ultrasonic motor according to claim 1, wherein a width of the outer peripheral electrode is set larger than a width of the inner peripheral electrode.

5. The ultrasonic motor according to claim 1, wherein the outer peripheral electrode is divided at positions where the divided electrode is short-circuited with the outer peripheral electrode by the outer peripheral short-circuiting electrode, and the inner peripheral electrode is divided at positions where the divided electrode is short-circuited with the inner peripheral electrode by the inner peripheral short-circuiting electrode.

6. The ultrasonic motor according to claim 1, wherein one of the plurality of divided electrodes which are short-circuited by the outer peripheral short-circuiting electrode is short-circuited by the outer peripheral short-circuiting electrode which is divided in the circumferential direction of the piezoelectric element.

7. An electronic apparatus on which the ultrasonic motor according to claim 1 is mounted.

8. The ultrasonic motor according to claim 3, wherein a width of the outer peripheral electrode is set larger than a width of the inner peripheral electrode.

9. The ultrasonic motor according to claim 2, wherein a width of the outer peripheral electrode is set larger than a width of the inner peripheral electrode.

10. The ultrasonic motor according to claim 4, wherein the outer peripheral electrode is divided at positions where the divided electrode is short-circuited with the outer peripheral electrode by the outer peripheral short-circuiting electrode, and the inner peripheral electrode is dividied at positions where the divided electrode is short-circuited with the inner peripheral electrode by the inner peripheral short-circuiting electrode.

11. The ultrasonic motor according to claim 3, wherein the outer peripheral electrode is divided at positions where the divided electrode is short-circuited with the outer peripheral electrode by the outer peripheral short-circuiting electrode, and the inner peripheral electrode is dividied at positions where the divided electrode is short-circuited with the inner peripheral electrode by the inner peripheral short-circuiting electrode.

12. The ultrasonic motor according to claim 2, wherein the outer peripheral electrode is divided at positions where the divided electrode is short-circuited with the outer peripheral electrode by the outer peripheral short-circuiting electrode, and the inner peripheral electrode is dividied at positions where the divided electrode is short-circuited with the inner peripheral electrode by the inner peripheral short-circuiting electrode.

13. The ultrasonic motor according to claim 5, wherein one of the plurality of divided electrodes which are short-circuited by the outer peripheral short-circuiting electrode is short-circuited by the outer peripheral short-circuiting electrode which is divided in the circumferential direction of the piezoelectric element.

14. The ultrasonic motor according to claim 4, wherein one of the plurality of divided electrodes which are short-circuited by the outer peripheral short-circuiting electrode is short-circuited by the outer peripheral short-circuiting electrode which is divided in the circumferential direction of the piezoelectric element.

15. The ultrasonic motor according to claim 3, wherein one of the plurality of divided electrodes which are short-circuited by the outer peripheral short-circuiting electrode is short-circuited by the outer peripheral short-circuiting electrode which is divided in the circumferential direction of the piezoelectric element.

16. The ultrasonic motor according to claim 2, wherein one of the plurality of divided electrodes which are short-circuited by the outer peripheral short-circuiting electrode is short-circuited by the outer peripheral short-circuiting electrode which is divided in the circumferential direction of the piezoelectric element.

17. An electronic apparatus on which the ultrasonic motor according to claim 2 is mounted.

18. An electronic apparatus on which the ultrasonic motor according to claim 3 is mounted.

19. An electronic apparatus on which the ultrasonic motor according to claim 4 is mounted.

20. An electronic apparatus on which the ultrasonic motor according to claim 5 is mounted.

21. The ultrasonic motor according to claim 1, wherein the divided electrodes have equal polarized areas.

* * * * *